United States Patent [19]
Blin et al.

[11] Patent Number: 5,255,944
[45] Date of Patent: Oct. 26, 1993

[54] COUPLER FOR A TEXTILE-REINFORCED RUBBER HOSE

[75] Inventors: Philippe Blin, Monts; Jacques LaDouce, La Chapelle Blanche, both of France

[73] Assignee: Hutchinson, Paris, France

[21] Appl. No.: 890,193

[22] Filed: May 29, 1992

[30] Foreign Application Priority Data

May 30, 1991 [FR] France .................. 91 06504

[51] Int. Cl.⁵ .................................. F16L 39/04
[52] U.S. Cl. .............................. 285/149; 285/256; 285/259; 285/239; 29/509
[58] Field of Search ............ 285/256, 259, 149, 239; 29/509

[56] References Cited

U.S. PATENT DOCUMENTS

| | | | |
|---|---|---|---|
| 2,172,532 | 9/1939 | Fentress | 285/256 |
| 2,384,635 | 9/1945 | Melsom . | |
| 3,990,729 | 11/1976 | Szentmihaly et al. | 285/256 X |
| 4,106,526 | 8/1978 | Szentmihaly . | |
| 4,142,554 | 3/1979 | Washkewicz et al. | 285/256 X |
| 4,603,888 | 8/1986 | Goodall et al. | 285/259 X |

FOREIGN PATENT DOCUMENTS

| | | | |
|---|---|---|---|
| 510400 | 6/1980 | Australia . | |
| 209121 | 5/1960 | Austria | 285/149 |
| 0405245 | 1/1991 | European Pat. Off. | 285/256 |
| 2001098 | 8/1970 | Fed. Rep. of Germany | 285/256 |
| 2242069 | 3/1974 | Fed. Rep. of Germany | 285/256 |
| 242334 | 12/1974 | Fed. Rep. of Germany | 285/256 |
| 2627100 | 10/1977 | Fed. Rep. of Germany . | |
| 3529889 | 3/1987 | Fed. Rep. of Germany . | |
| 1199001 | 12/1959 | France . | |
| 1395036 | 3/1965 | France | 285/256 |
| 0985544 | 12/1982 | U.S.S.R. | 285/256 |
| 1294132 | 10/1972 | United Kingdom | 285/256 |
| 1317618 | 5/1973 | United Kingdom | 285/256 |
| 2220242 | 1/1990 | United Kingdom | 285/256 |

Primary Examiner—Eric K. Nicholson
Assistant Examiner—Heather Chun
Attorney, Agent, or Firm—Lowe, Price, LeBlanc & Becker

[57] ABSTRACT

According to the invention, the coupler (1) for a textile-reinforced rubber hose is of the type comprising a metal end-fitting (2) and a metal bush (3) between which one end of the hose (5) is imprisoned by crimping. The coupler (1) has three separate zones, a zone (A) providing a fastening function, a zone (ED) providing a dynamic-sealing function and an intermediate zone (ES) providing a static-sealing function. Such a coupler enables textile-reinforced rubber hoses to be used at pressures of the order of 200 bar.

5 Claims, 1 Drawing Sheet

COUPLER FOR A TEXTILE-REINFORCED RUBBER HOSE

The present invention relates to a coupler for a textile-reinforced rubber hose, of the type comprising a metal end-fitting and a metal bush between which one end of the hose is imprisoned after crimping.

In general, any coupler has necessarily to fulfil a fastening function and a sealing function which is both static and dynamic.

BACKGROUND OF THE INVENTION

In a coupler of the abovementioned type, these functions are provided by two complementary sets of teeth and grooves provided on the external peripheral surface of the end-fitting and on the internal peripheral surface of the bush respectively.

In general, a textile-reinforced rubber hose has a better static and dynamic stiffness than a metal-reinforced rubber hose that is to say it enables in particular vibrations to which the hose may be subjected to be damped and their transmission to be limited, and it has good corrosion resistance.

However, for relatively high pressures of the order of 200 bar, the person skilled in the art always uses metal-reinforced hoses, especially for problems encountered in the region of hose couplers. In fact, by stripping the end of the hose in order to allow only the metal braid to remain, it is possible to perform a metal-to-metal crimping operation and thus to obtain a coupler which can also withstand such pressures. By contrast, knowing that this same crimping operation carried out on a textile reinforcement involves a shearing of the latter, it is preferred to carry out the crimping operation directly on the rubber without proceeding with the stripping of the textile braid, in order to protect it. The result is that the coupler is less able to withstand pressure because of the slip problems inherent in metal-rubber contacts, which limits the use of textile-reinforced rubber hoses.

In document DE-3 529 889, a coupler is described for a textile-reinforced hose, which comprises a fastening zone and a static-sealing zone, but such a coupler cannot withstand relatively high pressures, given that, in the fastening zone, the textile reinforcement is not directly in contact with the end-fitting and with the bush. In fact, after the crimping operation, the external jacket of the hose has undergone creep in the direction of the fastening zone.

The object of the invention is to design a coupler for a textile-reinforced hose, which can withstand high pressures, so as to combine the advantages of a metal-reinforced hose with those of a textile-reinforced hose without having the drawbacks thereof.

SUMMARY OF THE INVENTION

For this purpose, the invention proposes a coupler of the abovementioned type which has at least three separate zones, a zone providing a function of fastening solely to the textile reinforcement, an intermediate zone providing a static sealing function and a zone providing a dynamic sealing function.

The zone providing the fastening function is located at the coupler head and is formed, in a manner known per se, in the region of the end-fitting and of the bush of the coupler, of two complementary sets each comprising several uniformly-spaced annular teeth projecting from the external peripheral surface of the end-fitting and from the internal peripheral surface of the bush, two consecutive teeth delimiting between them an annular groove.

According to another characteristic of the invention, the teeth and the grooves of the fastening zone have, in cross section, a rounded and a preferably circular shape, along substantially equal radii of curvature in order to distribute the forces after crimping over all the teeth.

According to a preferred embodiment of the invention and in order even better to distribute these forces right along the fastening zone, the envelope delimited by the set of the teeth of the bush is flared slightly, at least toward that end of the fastening zone away from the coupler head.

The zone providing the dynamic-sealing function is located toward that end of the coupler away from the coupler head and it is also formed from two complementary sets of teeth and grooves which are provided on the external peripheral surface of the end-fitting and on the internal peripheral surface of the bush, respectively.

According to a further characteristic of the invention, the teeth and grooves of the zone providing the dynamic-sealing function have dimensions such that the compressive forces exerted in this zone, after crimping, gradually get smaller as that end of the coupler away from the coupler head is approached.

According to a preferred embodiment of the invention and in order to obtain virtually zero compressive forces, after crimping, at said end of the coupler, the envelope delimited by the teeth of the bush is flared slightly, at least toward this end.

Finally, according to a further characteristic of the invention, the intermediate zone providing the static-sealing function is a conical surface which provides the connection between the two abovementioned zones, the cross section of the static-sealing zone getting smaller in the direction of the dynamic-sealing zone.

According to a preferred embodiment of the invention, in the region of the dynamic-sealing zone, a complementary zone is provided which is intended to cause the rubber to creep, after crimping, in the direction of the conical portion in order to obtain better sealing.

Advantageously, the textile reinforcement is stripped over a greater length than that of the fastening zone in order to extend partially over the conical surface of the static-sealing zone.

BRIEF DESCRIPTION OF THE DRAWINGS

Other advantages, characteristics and details of the invention will emerge from the explanatory description which follows, and which is made with reference to the attached drawing, given solely by way of example, and in which.

DETAILED DESCRIPTION

Figure 1:
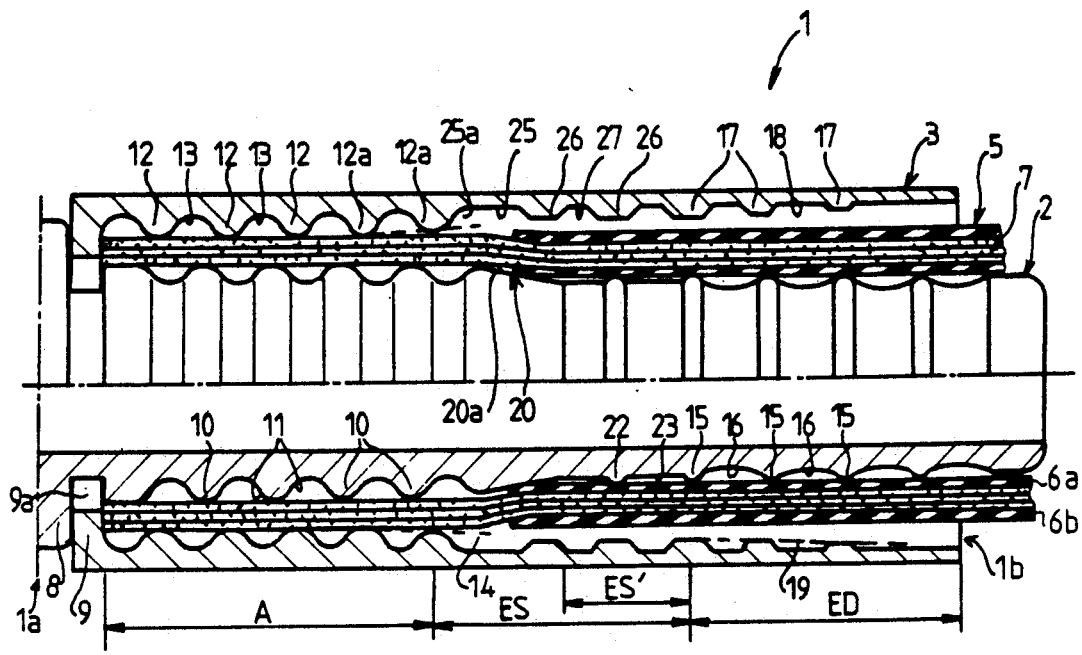
FIG. 1 is a sectional view of a coupler in accordance with the invention before the crimping operation.

A coupler in accordance with the invention comprises, in a manner known per se, a metal end-fitting 2 and a metal bush 3 between which is housed one end of a hose 5 consisting of two rubber covers, internal 6a and external 6b covers respectively, and of a textile reinforcement 7 interposed between the two covers.

At one end, which forms the coupler head 1a, the end-fitting 2 is terminated by a connecting element 8 such as a nut having a retention ring. The bush 3, at its end adjacent to the coupler head 1a, has a shoulder-forming internal rim 9 to be housed, after crimping, in a groove 9a provided on the external peripheral surface of the end-fitting 2.

The coupler 1 has three separate zones:
a zone A providing a fastening function,
a zone ED providing a dynamic-sealing function,
and an intermediate zone ES providing a static-sealing function.

In general, the zone A providing the fastening function is located on the coupler-head 1a side and it is formed from two complementary sets of teeth and grooves which are provided on the external peripheral surface of the end-fitting 2 and on the internal peripheral surface of the bush 3, respectively. The fastening zone A in the region of the end-fitting 2 is formed from several annular teeth 10 uniformly spaced along the zone A, two consecutive teeth 10 delimiting between them an annular groove 11. Each tooth 10 and each groove 11 have, in cross section, a rounded shape. Advantageously, the teeth 10 and the grooves 11 have a circular shape with substantially equal radii of curvature in order to form a uniform corrugation right along the fastening zone A.

In general, the fastening zone A in the region of the bush 3 is formed in a complementary manner from a set of teeth and grooves which in the main have the same characteristics as those of the grooves 11 and the teeth 10 of the end-fitting 2.

The hose 5 is stripped, in order to allow only the textile reinforcement 7 to remain, over the length corresponding to at least the length of the fastening zone A of the coupler, the rounded shaped of the teeth and of the grooves enabling the shearing of the textile braid 7 to be avoided as far as possible during the crimping operation, by virtue of a good distribution, over all the teeth, of the forces exerted.

However, in order for these forces to be even better distributed over all the teeth of the fastening zone A, both in the region of the end-fitting 2 and in the region of the bush 3, two series of successive teeth 12 and 12a are advantageously provided on the bush 3 starting from the coupler head 1a. The teeth 12 and the grooves 13 delimited by these teeth have in the main the same characteristics as those of the teeth 10 and the grooves 13 of the end-fitting 2. In other words, the envelope delimited by the teeth 12 of the end-fitting 2 is in the main cylindrical. By contrast, the envelope defined by the teeth 12a is slightly flared in the direction of that end of the fastening zone A away from the coupler head 1a, this flaring, indicated at 14, being obtained by a reduction in the height of the teeth 12a.

The zone ED providing the dynamic sealing is located toward the end 1b opposite the coupler head 1a and is also formed from two complementary sets of teeth and grooves which are provided on the external peripheral surface of the end-fitting 2 and on the internal peripheral surface of the bush 3. The zone ED in the region of the end-fitting 2 is formed from several annular teeth 15 which are rounded and uniformly spaced along this zone, two consecutive teeth 15 delimiting between them a rounded annular groove 16. In the example in question here, the radius of curvature of the teeth 15 is less than that of the teeth 10, 12 and 12a of the fastening zone A, but that of the grooves 16 is greater than the radius of curvature of the grooves 11 and 13 of the zone A.

In general, the zone ED corresponding to the dynamic-sealing function in the region of the bush 3 is also formed from a set of teeth 17 and grooves 18 which are intended to interact in a complementary manner with the set of grooves 16 and the teeth 15 of the zone ED associated with the end-fitting 2. Advantageously, the teeth 17 have, in cross section, a shape which is trapezoidal in the main and better adapted to the relatively wide grooves 16 of the end-fitting 2.

In order to obtain better dynamic sealing, that is to say in order for the coupler 1 to have better mechanical resistance to pressure surges without running the risk of rupturing the hose 5 in the region of the end 1b of the coupler 1, the envelope delimited by the teeth 17 of the bush 3 is slightly flared in the direction of the end 1b of the coupler 1, this flaring, indicated at 19, being obtained by a reduction in the height of the teeth.

The intermediate zone ES located between the abovementioned zones A and ED provides the static-sealing function for substantially constant pressures.

In the region of the external peripheral surface of the end-fitting 2, this zone ES is formed from a conical surface 20 of decreasing section between the fastening zone A as far as the dynamic-sealing zone ED.

According to a preferred embodiment of the invention, this conical surface 20 is extended in the direction of the zone ED by a complementary zone ES' whose function is to cause the rubber to creep in the direction of the conical surface 20 after the crimping operation. This zone ES' is formed from an annular tooth 22 which delimits with the first adjacent tooth 15 of the zone ED a groove 23 having a flat bottom and having a minimum depth in order for the rubber of the internal cover 6a to creep on either side of the groove 23.

In the region of the internal peripheral surface of the bush 3, the static-sealing zone ES is formed from an annular groove 25, which is in the main complementary to the conical surface 20 of the end-fitting 2, and from two trapezoidal annular teeth 26 which delimit between them an annular groove 27 which is complementary to the tooth 22 of the end-fitting 2.

The coupler 1, such as represented in FIG. 1, shows the positioning of the end-fitting 2, the bush 3 and the end of the hose 5 before the crimping operation.

It should be noted that the two sets of teeth and grooves of the end-fitting 2 and of the bush 3 are axially offset in relation to each other in order to compensate for the elongation of the bush 3 during the crimping operation. This misalignment is such that, at the end of this operation, the teeth of the bush 3 are facing the associated grooves of the end-fitting 2 and, conversely, the teeth of the end-fitting 2 are facing the associated grooves of the bush 3.

It should also be noted that the end of the hose 5, before being positioned between the end-fitting 2 and the bush 3, manually or automatically by means of a shrink-fitting device, has been stripped, in such a manner as to allow only the textile reinforcement 7 to remain, over a length extending beyond the fastening zone A.

In practice, the textile reinforcement 7 is bared as far as the vicinity of the central portion of the conical surface 20 of the zone ES providing the static-sealing function. In other words, before crimping, the rubber cover 6a of the hose 5 does not cover the base of the conical surface 20 of the end-fitting 2, adjacent to the fastening zone A, and leaves an empty space 20a and the external rubber cover 6b of the hose 5 does not extend over the entire width of the groove 25 of the bush 3 and allows an empty space 25a to remain on the side of the groove adjacent to the zone A.

Figure 2:
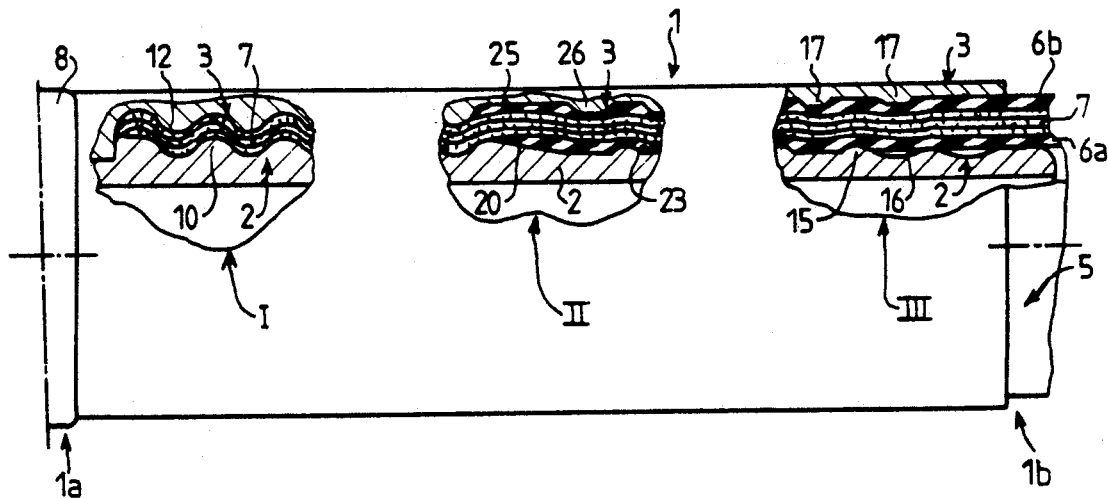
FIG. 2 is an exterior view of the coupler with partial cut-aways in order to show the deformation of the hose at various points of the coupler after the crimping operation.

Referring to FIG. 2, the coupler 1 is shown seen from the outside with three partial cut-aways I, II and III showing the deformation of the hose 5 after crimping in the three zones A, ES and ED, respectively.

In the zone A providing the fastening function (cut-away I), the textile reinforcement 7 has been deformed in order to match the corrugations formed by the set of teeth and grooves of this fastening zone A.

In the zone ES providing the static-sealing function (cut-away II), it is important to note that the abovementioned empty spaces 20a in the region of the conical surface 20 of the end-fitting 2 and 25a of the groove 20 of the bush 3 have been filled up as a result of the creep of the rubber of the internal 6a and external 6b covers, respectively.

Finally, in the zone ED providing the dynamic-sealing function (cut-away III), the grooves 18 of the end-fitting 2 which are located toward the end 1b of the coupler 1 are not entirely filled up by the rubber of the internal cover 6a, so as to allow a certain freedom for the hose 5 when it is subjected to pressure surges.

Of course, the invention is not limited to the previously described embodiment which is given solely by way of example. In particular, the various profiles given to the teeth and to the grooves of the fastening, static-sealing and dynamic-sealing zones may have slightly different shapes without thereby departing from the scope of the invention.

We claim:

1. A coupler for a textile-reinforced rubber hose, comprising a metal end-fitting and a metal bush between which one end of the hose is crimped, a textile reinforcement of the hose extending between internal and external rubber layers, said rubber layers having a free end said end-fitting and said bush being formed with three separate zones therebetween corresponding respectively to a fastening zone, an intermediate static-sealing zone and a dynamic-sealing zone, wherein:

said fastening zone is formed from two complementary sets of generally uniformly-spaced, non-helical annular teeth and grooves, substantially each tooth and substantially each groove having, in cross section, a rounded shape, with the textile reinforcement only extending into crimped contact in said zone with the teeth and grooves in each of said fastening end-fitting and the bush;

said dynamic-sealing zone is formed from two series of other spaced annular teeth and grooves therebetween, said series respectively located on the end-fitting and the bush, with the internal and external rubber layers coming substantially into crimping contact in said dynamic sealing zone with the end-fitting and the bush, respectively; and wherein said intermediate static-sealing zone is formed from at least one conical portion located on the end-fitting and an annular groove between two adjacent teeth located on the bush, which together defines a means for allowing creep of the free ends of the internal and external rubber layers about said conical portion and in said groove, respectively, during crimping, and an annular tooth located on the end-fitting which delimits, with an adjacent tooth thereto of said dynamic sealing zone, a groove having a flat bottom.

2. The coupler of claim 1, wherein said fastening zone comprises, in direction of said intermediate static-sealing zone, a second series of annular teeth being substantially uniformly spaced on the internal peripheral surface of the bush, an envelope defined by said teeth being flared radially outward in the direction of said intermediate static-sealing zone.

3. The coupler of claim 1, wherein each of the annular teeth and grooves located on the internal peripheral surface of the bush in said dynamic-sealing zone has a rounded shape in cross section.

4. The coupler of claim 3, wherein each of the annular teeth and grooves located on the external peripheral surface of the end-fitting in said dynamic-sealing zone has in cross section a shape which is substantially trapezoidal and said end fitting has a free end adjacent said dynamic-sealing zone.

5. The coupler of claim 4, wherein an envelope defined by said annular teeth is flared radially outward in the direction of the free end of the coupler.

* * * * *